US012649506B2

(12) United States Patent
Li et al.

(10) Patent No.: US 12,649,506 B2
(45) Date of Patent: Jun. 9, 2026

(54) SHOPPING TROLLEY

(71) Applicants: Miao Li, Beijing (CN); Yongpan Shi, Yongkang City (CN)

(72) Inventors: Miao Li, Beijing (CN); Yongpan Shi, Yongkang City (CN)

( * ) Notice: Subject to any disclaimer, the term of this patent is extended or adjusted under 35 U.S.C. 154(b) by 352 days.

(21) Appl. No.: 18/588,528

(22) Filed: Feb. 27, 2024

(65) Prior Publication Data

US 2024/0199104 A1     Jun. 20, 2024

(51) Int. Cl.
B62B 3/00 (2006.01)
B62B 3/02 (2006.01)
B62B 3/10 (2006.01)
B62B 3/14 (2006.01)

(52) U.S. Cl.
CPC .............. B62B 3/002 (2013.01); B62B 3/008 (2013.01); B62B 3/02 (2013.01); B62B 3/106 (2013.01); B62B 3/14 (2013.01)

(58) Field of Classification Search
CPC ........... B62B 3/02; B62B 3/002; B62B 3/008; B62B 3/106; B62B 3/14
See application file for complete search history.

(56) References Cited

U.S. PATENT DOCUMENTS 4,248,442 A * 2/1981 Barrett ...................... B62B 5/06
                                                                206/505
5,427,394 A * 6/1995 Lauto ....................... B62B 3/02
                                                                280/47.35

| | | | | |
|---|---|---|---|---|
| 8,424,883 B1 * | 4/2013 | Ramos | ...................... | B62B 3/02 |
| | | | | 280/47.35 |
| 8,505,960 B1 * | 8/2013 | Shindelar | ................ | B62B 3/022 |
| | | | | 280/651 |
| 9,205,951 B1 * | 12/2015 | Roman | ................... | B65D 25/10 |
| 9,655,307 B2 * | 5/2017 | Burmann | ............... | A01G 9/029 |
| D1,002,985 S * | 10/2023 | Yu | ................................. | D34/21 |
| 11,866,084 B2 * | 1/2024 | Moore | ................... | B62B 3/1424 |
| 2022/0379939 A1 * | 12/2022 | Codispoti | ............ | B65D 21/086 |
| 2024/0010255 A1 * | 1/2024 | Smith | ................... | B62B 5/0033 |
| 2024/0190490 A1 * | 6/2024 | Thomas | ................... | B62B 3/02 |
| 2024/0199104 A1 * | 6/2024 | Li | ........................... | B62B 3/002 |
| 2024/0343284 A1 * | 10/2024 | Fitzwater | ................ | B62B 3/02 |

* cited by examiner

*Primary Examiner* — Jeffrey J Restifo

(57) ABSTRACT

The present disclosure relates to a shopping trolley, including a support frame and a storage basket. The storage basket includes a first storage basket and a second storage basket, the second storage basket is capable of being placed in the first storage basket, the first storage basket and the second storage basket are slidingly connected through an adjustment mechanism, and the adjustment mechanism is provided with a fixing mechanism. The adjustment mechanism comprises a first connecting rod and a second connecting rod slidably arranged in the first connecting rod, two ends of the first connecting rod are respectively connected to the top and bottom of the first storage basket, and two ends of the second connecting rod are respectively connected to the top and bottom of the second storage basket. It avoids the problem of small items falling, and realizes the simultaneous transportation of smaller and larger items.

10 Claims, 8 Drawing Sheets

SHOPPING TROLLEY

TECHNICAL FIELD

The present disclosure relates to the field of shopping tools, and in particular to a shopping trolley.

BACKGROUND

Shopping trolleys are often used in life and work. Since shopping trolleys can not only accommodate many items, but also save physical energy, they are used to transport commonly used items in life. For example, they are used by office workers to delivery office supplies to the office after purchasing them. For another example, it can be used to convey items to your home after shopping in the supermarket, or it can be used for people to transport the express package to their home after going to the express station to pick up the express package.

At present, in order to meet different needs, various shopping trolleys have appeared on the market. As the basic setting of the shopping trolleys, they have a bottom frame to support items, wheels arranged under the bottom frame to move the trolley, and a push-pull rack connected to the bottom frame for pushing and pulling. For one type of shopping trolleys, they are fixedly equipped with a storage basket on the bottom frame to accommodate items, for another type of shopping trolleys, they are configured to be foldable, and for further another type of shopping trolleys, they are removably provided with a storage bag or storage basket, so that when items larger than the size of the storage bag or storage basket need to be transported, the storage bag or storage basket can be disassembled and the items can be directly placed on the bottom frame for transportation. However, for this type of shopping trolleys, after the storage bag or the storage basket is disassembled, small items can only be stacked on large items, and there is a problem of small items falling during transportation.

SUMMARY

In order to solve the above-mentioned technical problems, the present disclosure provides a shopping trolley.

A shopping trolley, comprising a support frame and a storage basket connected to the support frame and forming an accommodation space with the support frame, wherein the storage basket includes a first storage basket and a second storage basket located above the first storage basket, the second storage basket is capable of being placed in the first storage basket, the first storage basket and the second storage basket are slidingly connected to each other through an adjustment mechanism, and the adjustment mechanism is provided with a fixing mechanism for fixing positions of the first storage basket and the second storage basket;

wherein the adjustment mechanism comprises a first connecting rod and a second connecting rod slidably arranged in the first connecting rod, two ends of the first connecting rod are respectively connected to the top and bottom of the first storage basket, and two ends of the second connecting rod are respectively connected to the top and bottom of the second storage basket.

According to some embodiments of the present disclosure, the first storage basket and the second storage basket are in the shape of a cube, four first connecting rods and four second connecting rods are provided, and the four first connecting rods are respectively provided at four inner corners of the first storage basket, and the second connecting rods are respectively provided at four outer corners of the second storage basket.

According to some embodiments of the present disclosure, a plurality of third connecting rods are vertically arranged on the first storage basket, a plurality of fourth connecting rods are vertically arranged on the second storage basket, and the fourth connecting rods are slidingly connected to the third connecting rods.

According to some embodiments of the present disclosure, the second storage basket is provided with a built-in bag, and an open end of the built-in bag is connected to the top of the second storage basket.

According to some embodiments of the present disclosure, the second storage basket comprises horizontal rods, a first sliding rod and a second sliding rod, the first sliding rod and the second sliding rod are provided with a movable hole at their respective center, a first movable shaft runs through the movable holes movably, two ends of the first sliding rod and the second sliding rod are movably connected to two ends of two horizontal rods, a folding part is composed of the two horizontal rods, the first sliding rod and the second sliding rod, the folding part is slidingly connected to the adjacent second connecting rod, the folding part and two second connecting rods form a first side wall, a second side wall, a third side wall and a fourth side wall are formed in the same way with the first side wall, and four side walls together form the second storage basket.

According to some embodiments of the present disclosure, any side wall of the first storage basket is provided with an opening.

According to some embodiments of the present disclosure, the first storage basket and the second storage basket are cylindrical in shape, and a side wall of the first connecting rod is connected to an inner side wall of the first storage basket, and a side wall of the second connecting rod is connected to an outer side wall of the second storage basket.

According to some embodiments of the present disclosure, the fixing mechanism comprises a slot and a hook, and the slot is arranged in a top end of the first connecting rod, the hook is rotatably provided at a bottom end of the second connecting rod.

According to some embodiments of the present disclosure, a front wheel assembly and a rear wheel assembly are connected to the bottom of the support frame;

the front wheel assembly is connected to a bottom wall of the support frame;

the rear wheel assembly comprises a wheel support frame rotatably connected to the support frame, and a plurality of wheels are provided on the wheel support frame.

According to some embodiments of the present disclosure, the support frame is of a telescopic structure.

Compared with the prior art, the beneficial effects of the present disclosure are:

I. In the shopping trolley provided by the present disclosure, the second storage basket is positioned inside the first storage basket through the adjustment mechanism, and the height of the storage basket is lowered, but it can form two spaces, one is the accommodation/storage space formed by the storage basket, and the other is the space above the storage basket. Therefore, when transporting items, the user can first place small items in the accommodation space, and then place large items in the space above the storage basket, avoiding the problem of small items falling and achieving simultaneous transportation of items smaller than the size of the storage basket and items larger than the size of the storage basket.

II. In the shopping trolley provided by the present disclosure, any side wall of the first storage basket is provided with an opening. When large items are placed above the storage basket, small items can be put into the accommodation space through the opening.

III. The shopping trolley provided by the present disclosure is provided with a built-in bag in the storage basket, it can prevent items from being left behind.

Figure 1:
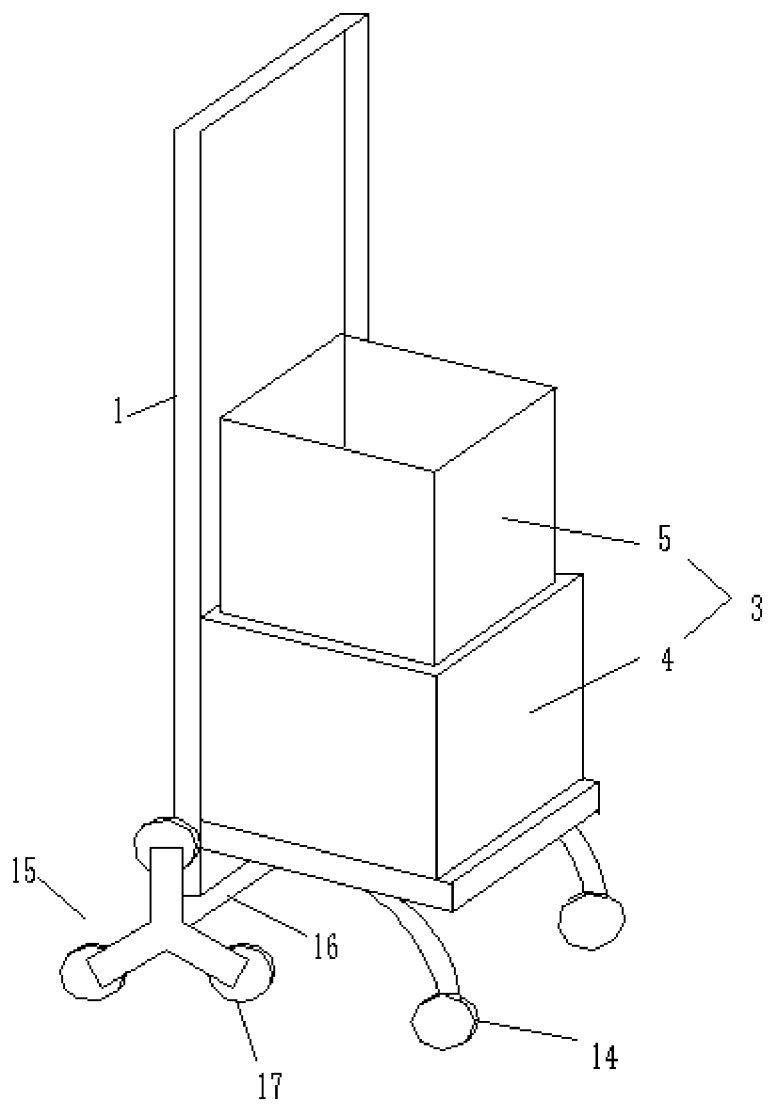
FIG. 1 is a schematic structural view of a shopping trolley provided by the present disclosure when it is stretched.
Figure 2:
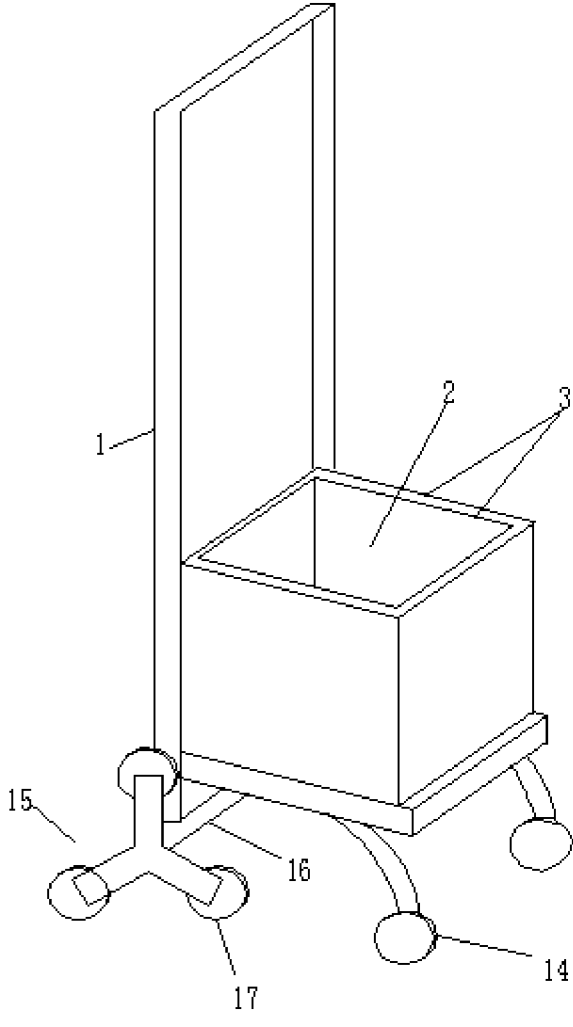
FIG. 2 is a schematic structural view of the shopping trolley provided by the present disclosure when it is contracted.

Note: To ensure clear lines, the first storage basket and the second storage basket in FIGS. 1, 2, 3, 5, and 6 are shown in a single-line way.

Reference numeral: 1. Support frame; 2. Accommodation space; 3. Storage basket; 4. First storage basket; 5. Second storage basket; 6. First connecting rod; 7. Second connecting rod; 8. Third connecting rod; 9. Fourth connecting rod; 10. Built-in bag; 11. Railing; 12. Slot; 13. Hook; 14. Front wheel assembly; 15. Rear wheel assembly; 16. Wheel support frame; 17. Wheel; 18. Opening; 19. Horizontal bar; 20. First sliding rod; 21. Second sliding rod; 22 First movable shaft; 23. Second movable shaft; 24. Third movable shaft.

DETAILED DESCRIPTION OF EMBODIMENTS

Specific embodiments of the present disclosure will be described in detail below, but it should be understood that the protection scope of the present disclosure is not limited by the specific embodiments. Based on the embodiments of the present disclosure, all other embodiments obtained by those of ordinary skill in the art without any creative work fall within the scope of protection of the present disclosure. The experimental methods described in the various embodiments of the present disclosure are all conventional methods unless otherwise specified.

Embodiment 1

As shown in FIG. 1, a shopping trolley includes a support frame 1 and a storage basket 3 connected to the support frame 1 and forming an accommodation space 2 with the support frame 1. The storage basket 3 includes a first storage basket 4 and a second storage basket 5 located above the first storage basket 4, the second storage basket 5 can be placed in the first storage basket 4, the first storage basket 4 and the second storage basket 5 are slidingly connected to each other through an adjustment mechanism, and the adjustment mechanism is provided with a fixing mechanism for fixing the positions of the first storage basket 4 and the second storage basket 5.

Figure 3:
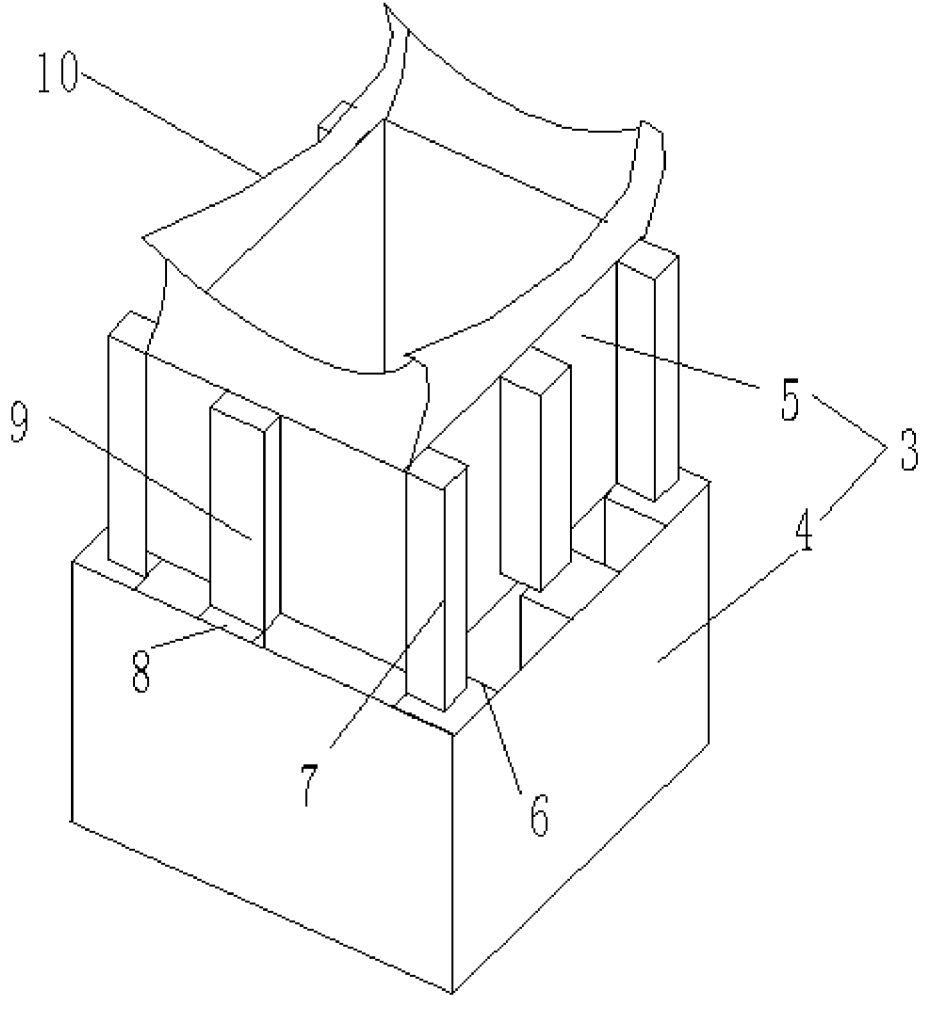
FIG. 3 is a schematic view showing the connection relationship between the first storage basket and the second storage basket when stretched in a first embodiment.
Figure 4:
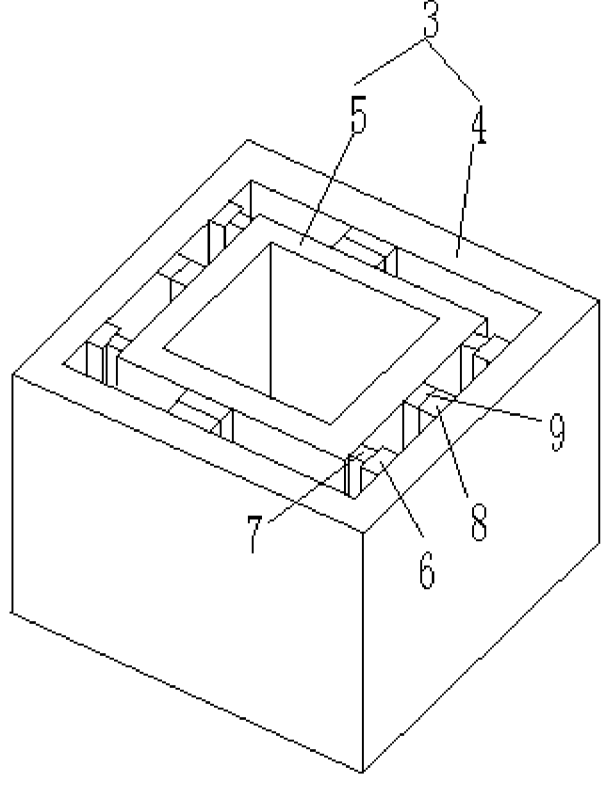
FIG. 4 is a schematic view showing the state in which the first storage basket and the second storage basket are contracted in the first embodiment.
Figure 7:
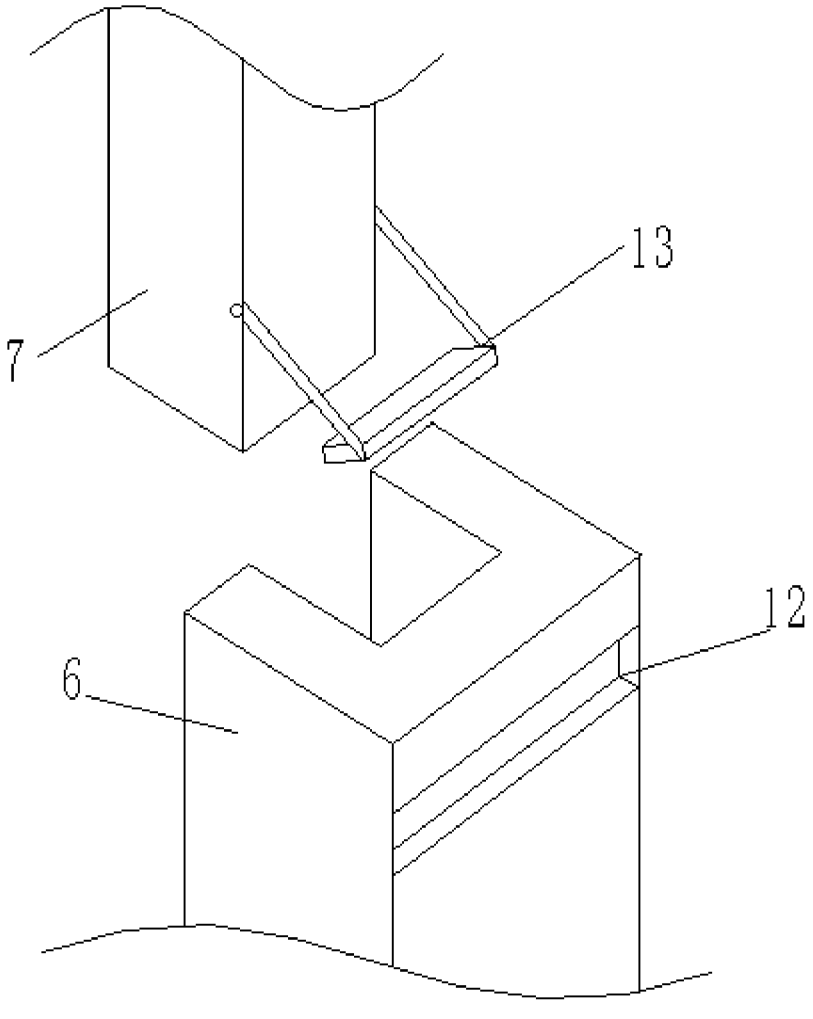
FIG. 7 is a schematic structural view of the fixing mechanism.

As shown in FIGS. 3 and 7, the adjustment mechanism includes first connecting rods 6 and second connecting rods 7, which are respectively slidably provided in the first connecting rods 6. Specifically, the first connecting rod 6 is provided with a first opening, and the second connecting rod 7 is located in the first opening. There is a distance of 2 mm between the side wall of the second connecting rod 7 and the side wall of the first opening. The two ends of the first connecting rod 6 are connected to the top and bottom of the first storage basket 4 respectively, and the two ends of the second connecting rod 7 are connected to the top and bottom of the second storage basket 5 respectively.

In use, when transporting items smaller than the size of the storage basket 3, the items are placed in the accommodation space 2 formed by the first storage basket 4 and the second storage basket 5. When transporting items larger than the size of the storage basket 3, the fixing effect of the fixing mechanism is removed, the second connecting rods 7 are slid inside the first connecting rods 6, so that the second storage basket 5 is located in the first storage basket 4, the height of the storage basket 3 is thereby lowered, and the items are stacked above the storage basket 3. Since the height of the storage basket 3 is reduced, more space can be used to place large items, and it avoids from disassembling the storage basket or storage bag in the prior art and is easy to use.

More importantly, when transporting items, the second storage basket 5 is located in the first storage basket 4, it lowers the height of the storage basket 3, and two spaces are formed, one is formed by the storage basket. 3, the other is the space above the storage basket 3. Therefore, when transporting items, the user can first place small items in the accommodation space 2, and then place large items in the space above the storage basket 3, it avoids the problem of small items falling, and enables simultaneous transportation of items smaller than the size of the storage basket 3 and items larger than the size of the storage basket 3.

It should be noted that in the present disclosure, the side walls of the first storage basket 4 and the second storage basket 5 may be made of horizontally and vertically staggered side bars with intervals, or the side walls may also be made of sealed plates.

In this embodiment, as shown in FIG. 1, the first storage basket 4 and the second storage basket 5 are in the shape of a cube, and the number of the first connecting rods 6 and the second connecting rods 7 are respectively four, four first connecting rods 6 are respectively arranged at four inner corners of the first storage basket 4, and four second connecting rods 7 are respectively arranged at four outer corners of the second storage basket 5. The fact that the first connecting rod 6 and the second connecting rod 7 are respectively arranged at the corners is beneficial to the stability of the connection between the first storage basket 4 and the second storage basket 5.

In this embodiment, as shown in FIG. 3, several third connecting rods 8 are vertically provided on the first storage basket 4, and fourth connecting rods 9 are vertically provided on the second storage basket 5. The fourth connecting rods 9 are slidingly connected to the third connecting rods 8.

Specifically, the fourth connecting rods 9 and the third connecting rods 8 are connected in a similar manner to the first connecting rods 6 and the second connecting rods 7, which is beneficial to prevent the first storage basket 4 from deforming.

In this embodiment, as shown in FIG. 3, the second storage basket 5 is provided with a built-in bag 10, and the open end of the built-in bag 10 is connected to the top of the second storage basket 5. The bottom end of the built-in bag 10 is located on the bottom wall of the support frame 1. The built-in bag 10 is arranged in the first storage basket 4 and the second storage basket 5. When the side wall has a gap, this can prevent smaller items from being left behind.

In this embodiment, as shown in FIG. 7, the fixing mechanism includes a slot 12 and a hook 13. The slot 12 is provided at the top end of the first connecting rod 6, and the hook 13 is rotatably arranged on the bottom end of the second connecting rod 7. The raised second connecting rod 7 and the first connecting rod 6 are fixed through the hook 13 and the slot 12.

In this embodiment, as shown in FIG. 1, a front wheel assembly 14 and a rear wheel assembly 15 are connected to the bottom of the support frame 1; the front wheel assembly 14 is connected to the bottom wall of the support frame 1; the rear wheel assembly 15 includes a wheel support frame 16 that is rotatably connected to the support frame 1. The wheel support frame 16 is provided with a plurality of wheels 17. The front wheel assembly 14 and the rear wheel assembly 15 enable movement on flat ground, steps and other non-flat ground.

In this embodiment, the support frame 1 is of a telescopic/retractable structure. When the shopping trolley is not in use, the telescopic structure is used to lower the height of the support frame 1 so that the second storage basket 5 is located in the first storage basket 4, the height of the shopping trolley is reduced as a whole, saving space. When using the shopping trolley, the height of the support frame 1 can be adjusted according to the size of large items, thereby facilitating the transportation of large items. The telescopic structure refers to the lift rods of the luggage case in the prior art.

Embodiment 2

As shown in FIG. 1, a shopping trolley includes a support frame 1 and a storage basket 3 connected to the support frame 1 and forming an accommodation space 2 with the support frame 1. The storage basket 3 includes a first storage basket 4 and the second storage basket 5 located above the first storage basket 4, the second storage basket 5 can be placed in the first storage basket 4, the first storage basket 4 and the second storage basket 5 are slidingly connected through an adjustment mechanism, and the adjustment mechanism is provided with a fixing mechanism for fixing the positions of the first storage basket 4 and the second storage basket 5.

As shown in FIGS. 3 and 7, the adjustment mechanism includes first connecting rods 6 and second connecting rods 7 slidably provided in the first connecting rods 6. Specifically, the first connecting rod 6 is provided with a first opening, and the second connecting rod 7 is located in the first opening. There is a distance of 2 mm between the side wall of the second connecting rod 7 and the side wall of the first opening. The two ends of the first connecting rod 6 are connected to the top and bottom of the first storage basket 4 respectively, and the two ends of the second connecting rod 7 are connected to the top and bottom of the second storage basket 5 respectively.

The shape of the first storage basket 4 and the second storage basket 5 is a cube, and there are four first connecting rods 6 and four second connecting rods 7 respectively. The four first connecting rods 6 are respectively provided at the four inner corners of the first storage basket 4, and the four second connecting rods 7 are respectively provided at the four outer corners of the second storage basket 5.

As shown in FIG. 7, the fixing mechanism includes a slot 12 and a hook 13. The slot 12 is provided in the first connecting rod 6, and the hook 13 is rotatably provided on the second connecting rod 7. The raised second connecting rod 7 and the first connecting rod 6 are fixed through the hook 13 and the slot 12.

Figure 5:
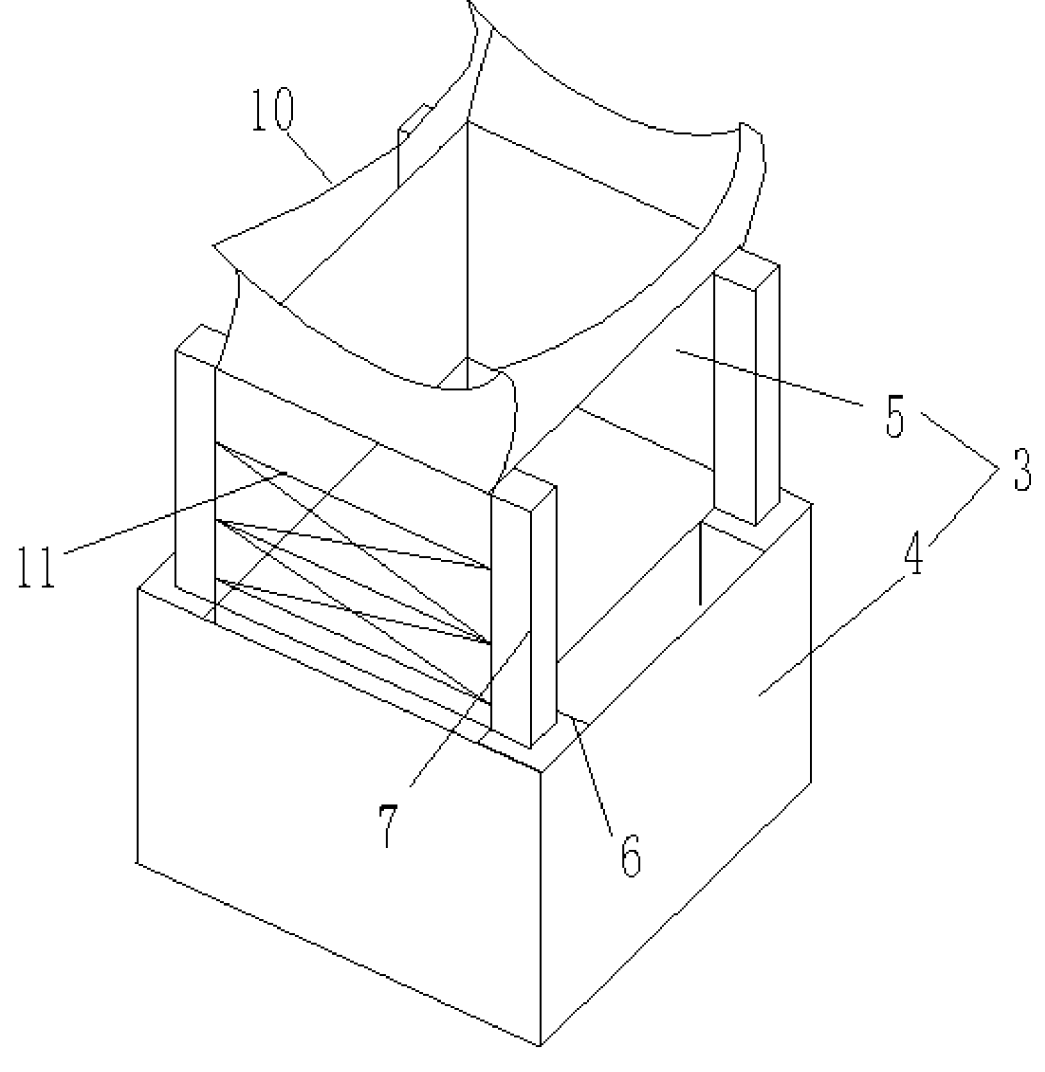
FIG. 5 is a schematic view showing the connection relationship between the first storage basket and the second storage basket when stretched in a second embodiment.
Figure 8:
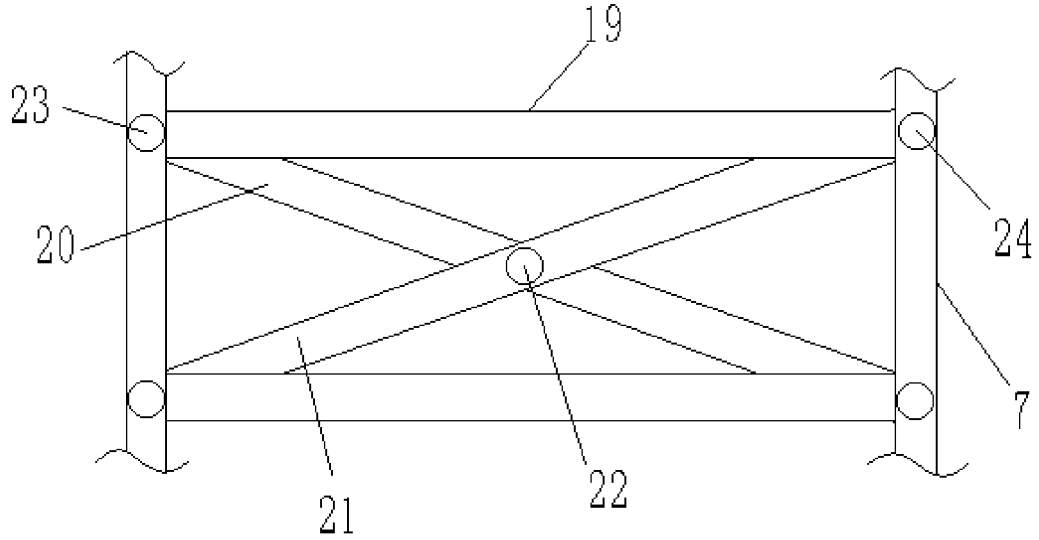
FIG. 8 is a schematic structural view of the second storage basket.

In this embodiment, as shown in FIGS. 5 and 8, the second storage basket 5 includes horizontal rods 19, a first sliding rod 20 and a second sliding rod 21. The first sliding rod 20 and the second sliding rod 21 are each provided with a first movable hole 1 at their center. A first movable shaft 22 is movable through the movable hole 1. The two ends of the first sliding rod 120 and the second sliding rod 21 are movablely connected to the two ends of the two horizontal rods 19. Specifically, the two ends of the first sliding rod 20 are provided with second movable holes, and second movable shafts 23 are movable through the two movable holes, the two ends of the second sliding rod 21 are provided with third movable holes, third movable shafts 24 are movable through the third movable holes. The second movable shaft 23 and the third movable shaft 24 are movably connected to the two ends of the horizontal rod 19. The two horizontal rods 19, the first sliding rod 20 and the second sliding rod 21 form a folding part, and the folding part is slidingly connected to the adjacent second connecting rod 7, so that the folding part and two second connecting rods 7 form a first side wall. Specifically, the second connecting rod 7 is provided with a slide rail, and the second movable shaft 23 is slidably connected in the slide rail. The second side wall, the third side wall, and the fourth side wall are formed in the same way with the first side wall, and the four side walls constitute the second storage basket 5. It can be folded in the vertical direction so that the second storage basket 5 can be folded downward to obtain a second storage space. The second storage basket 5 can be folded downward as shown in FIG. 6.

Figure 6:
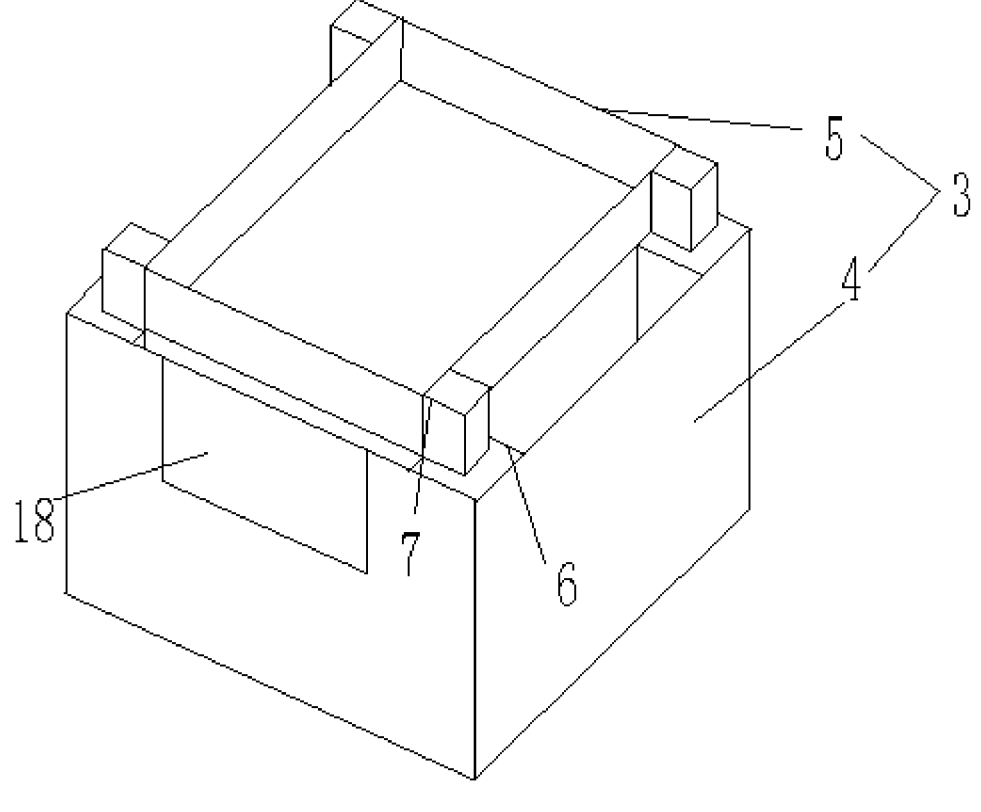
FIG. 6 is a schematic view showing the state in which the first storage basket and the second storage basket are contracted in the second embodiment.

In this embodiment, as shown in FIG. 6, an opening 18 is provided in any side wall of the first storage basket 4. When large items have been placed above the storage basket 3, small items can be put into the accommodation space through the opening 18.

When this embodiment is in use, the folding part is used to fold the second storage basket 5, thereby reducing the height of the second storage basket 5. After the height of the second storage basket 5 is reduced, two spaces are formed, one is the accommodation space 2 formed by the lowered second storage basket 5 and the first storage basket 4, and the other is the space between the second storage basket 5 and the second connecting rods 7. When transporting items, small items are placed in the accommodation space 2 and large items are placed above the second storage basket 5, thereby realizing simultaneous transportation of items smaller than the size of the storage basket 3 and items larger than the size of the storage basket 3. The second connecting rods 7 restrict the movement of large items, thereby preventing the problem of becoming unstable during transportation when large items are stacked above the second storage basket 5.

In this embodiment, as shown in FIG. 1, a front wheel assembly 14 and a rear wheel assembly 15 are connected to the bottom of the support frame 1; the front wheel assembly 14 is connected to the bottom wall of the support frame 1; the rear wheel assembly 15 includes a wheel support frame 16 that is rotatably connected to the support frame 1. The wheel support frame 16 is provided with a plurality of wheels 17. The front wheel assembly 14 and the rear wheel assembly 15 enable movement on flat ground, steps and other non-flat ground.

In this embodiment, the support frame 1 is of a telescopic/retractable structure. When the shopping trolley is not in use, the telescopic structure is used to lower the height of the support frame 1 so that the second storage basket 5 is located in the first storage basket 4, the height of the shopping trolley is reduced as a whole, saving space. When using the shopping trolley, the height of the support frame 1 can be adjusted according to the size of large items, thereby facilitating the transportation of large items. The telescopic structure refers to the lift rod of the luggage case in the prior art.

Embodiment 3

A shopping trolley includes a support frame 1 and a storage basket 3 connected to the support frame 1 and forming an accommodation space 2 with the support frame 1. The storage basket 3 includes a first storage basket 4 and a second storage basket 5 located above the first storage basket 4. The second storage basket 5 can be placed in the first storage basket 4. The first storage basket 4 and the second storage basket 5 are slidingly connected through the adjustment mechanism, the adjustment mechanism is provided with a fixing mechanism for fixing the positions of the first storage basket 4 and the second storage basket 5.

The adjustment mechanism includes first connecting rods 6 and second connecting rods 7 slidably provided in the first connecting rods 6. Specifically, the first connecting rod 6 is provided with a first opening, and the second connecting rod 7 is located in the first opening. There is a distance of 2 mm between the side wall of the second connecting rod 7 and the side wall of the first opening. Two ends of the first connecting rod 6 are connected to the top and bottom of the first storage basket 4 respectively, and the two ends of the second connecting rod 7 are respectively connected to the top and bottom of the second storage basket 5.

The shape of the first storage basket 4 and the second storage basket 5 is cylindrical, the side wall of the first connecting rod 6 is connected to the inner side wall of the first storage basket 4, and the side wall of the second connecting rod 7 is connected to the outer side wall of the second storage basket 5.

In this embodiment, as shown in FIG. 7, the fixing mechanism includes a slot 12 and a hook 13. The slot 12 is provided in the first connecting rod 6, and the hook 13 is rotatably provided on the second connecting rod 7. The raised second connecting rod 7 and the first connecting rod 6 are fixed through the hook 13 and the slot 12.

When this embodiment is used, the usage method is the same as that of Embodiment 1. The difference is that the storage basket formed by the first storage basket 4 and the second storage basket 5 has a circular shape to avoid the edges and corners of a cubic storage basket from causing collision to the user.

In this embodiment, as shown in FIG. 1, a front wheel assembly 14 and a rear wheel assembly 15 are connected to the bottom of the support frame 1; the front wheel assembly 14 is connected to the bottom wall of the support frame 1; the rear wheel assembly 15 includes a wheel support frame 16 that is rotatably connected to the support frame 1. The wheel support frame 16 is provided with a plurality of wheels 17. The front wheel assembly 14 and the rear wheel assembly 15 enable movement on flat ground, steps and other non-flat ground.

In this embodiment, the support frame 1 is of a telescopic/retractable structure. When the shopping trolley is not in use, the telescopic structure is used to lower the height of the support frame 1 so that the second storage basket 5 is located in the first storage basket 4, the height of the shopping trolley is reduced as a whole, saving space. When using the shopping trolley, the height of the support frame 1 can be adjusted according to the size of large items, thereby facilitating the transportation of large items. The telescopic structure refers to the lift rod of the luggage case in the prior art.

It should be noted that, when the claims of the present disclosure refer to numerical ranges, it should be understood that the two endpoints of each numerical range and any numerical value between the two endpoints can be selected. To avoid redundancy, the present disclosure describes the preferred embodiments.

Although the preferred embodiments of the present disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of the present disclosure.

Obviously, those skilled in the art can make various changes and modifications to the present disclosure without departing from the spirit and scope of the present disclosure. In this way, if these changes and modifications to the present disclosure fall within the scope of the claims of the present disclosure and equivalent technologies, the present disclosure is also intended to include these changes and modifications.

What is claimed is:

1. A shopping trolley, comprising a support frame (1) and a storage basket (3) connected to the support frame (1) and forming an accommodation space (2) with the support frame (1), wherein the storage basket (3) includes a first storage basket (4) and a second storage basket (5) located above the first storage basket (4), the second storage basket (5) is capable of being placed in the first storage basket (4), the first storage basket (4) and the second storage basket (5) are slidingly connected to each other through an adjustment mechanism, and the adjustment mechanism is provided with a fixing mechanism for fixing positions of the first storage basket (4) and the second storage basket (5);

wherein the adjustment mechanism comprises a first connecting rod (6) and a second connecting rod (7) slidably arranged in the first connecting rod (6), two ends of the first connecting rod (6) are respectively connected to the top and bottom of the first storage basket (4), and two ends of the second connecting rod (7) are respectively connected to the top and bottom of the second storage basket (5).

2. The shopping trolley according to claim 1, wherein the first storage basket (4) and the second storage basket (5) are in the shape of a cube, four first connecting rods (6) and four second connecting rods (7) are provided, and the four first connecting rods (6) are respectively provided at four inner corners of the first storage basket (4), and the second connecting rods (7) are respectively provided at four outer corners of the second storage basket (5).

3. The shopping trolley according to claim 2, wherein a plurality of third connecting rods (8) are vertically arranged on the first storage basket (4), a plurality of fourth connecting rods (9) are vertically arranged on the second storage basket (5), and the fourth connecting rods (9) are slidingly connected to the third connecting rods (8).

4. The shopping trolley according to claim 3, wherein the second storage basket (5) is provided with a built-in bag (10), and an open end of the built-in bag (10) is connected to the top of the second storage basket (5).

5. The shopping trolley according to claim 2, wherein the second storage basket (5) comprises horizontal rods (19), a first sliding rod (20) and a second sliding rod (21), the first sliding rod (20) and the second sliding rod (21) are provided with a movable hole at their respective center, a first movable shaft (22) runs through the movable holes movably, two ends of the first sliding rod (20) and the second sliding rod (21) are movably connected to two ends of two horizontal rods (19), a folding part is composed of the two horizontal rods, the first sliding rod (20) and the second sliding rod (21), the folding part is slidingly connected to the adjacent second connecting rod (7), the folding part and two second connecting rods (7) form a first side wall, a second side wall, a third side wall and a fourth side wall are formed in the same way with the first side wall, and four side walls together form the second storage basket (5).

6. The shopping trolley according to claim 5, wherein any side wall of the first storage basket (4) is provided with an opening (18).

7. The shopping trolley according to claim 1, wherein the first storage basket (4) and the second storage basket (5) are cylindrical in shape, and a side wall of the first connecting rod (6) is connected to an inner side wall of the first storage basket (4), and a side wall of the second connecting rod (7) is connected to an outer side wall of the second storage basket (5).

8. The shopping trolley according to claim 1, wherein the fixing mechanism comprises a slot (12) and a hook (13), and the slot (12) is arranged in a top end of the first connecting rod (6), the hook (13) is rotatably provided at a bottom end of the second connecting rod (7).

9. The shopping trolley according to claim 1, wherein a front wheel assembly (14) and a rear wheel assembly (15) are connected to the bottom of the support frame (1);

the front wheel assembly (14) is connected to a bottom wall of the support frame (1);

the rear wheel assembly (15) comprises a wheel support frame (16) rotatably connected to the support frame (1), and a plurality of wheels (17) are provided on the wheel support frame (16).

10. The shopping trolley according to claim 1, wherein the support frame (1) is of a telescopic structure.

* * * * *